July 29, 1969
L. C. WATKINS, JR
3,458,727
POLAR TELEGRAPHY RECEIVE CURRENT LOOP
WITH SOLID-STATE SWITCHING BRIDGE
Filed Jan. 3, 1966
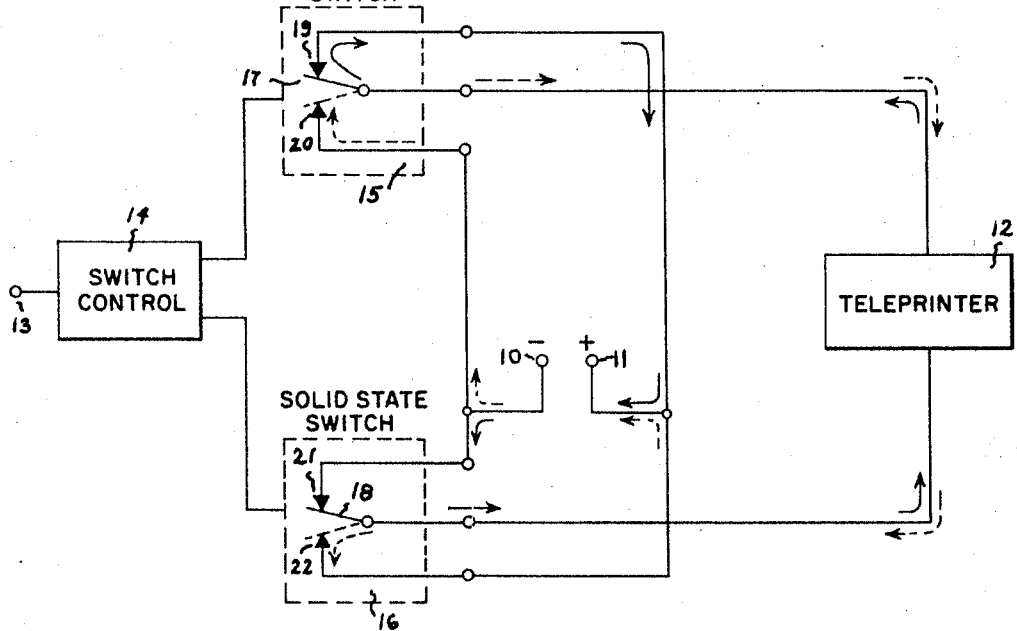
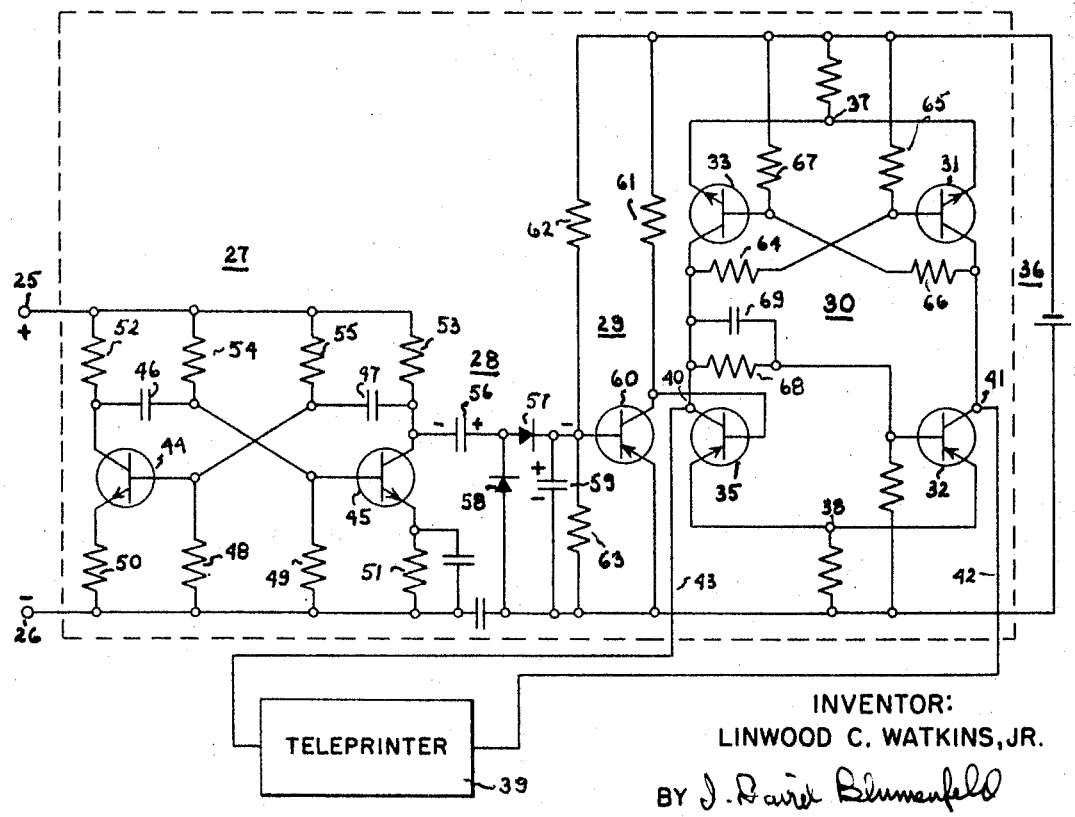
INVENTOR:
LINWOOD C. WATKINS, JR.
BY J. David Blumenfeld
HIS ATTORNEY.

United States Patent Office

3,458,727
Patented July 29, 1969

---

3,458,727
POLAR TELEGRAPHY RECEIVE CURRENT LOOP WITH SOLID-STATE SWITCHING BRIDGE
Linwood C. Watkins, Jr., Lynchburg, Va., assignor to General Electric Company, a corporation of New York
Filed Jan. 3, 1966, Ser. No. 518,456
Int. Cl. H04l 27/00, 17/16
U.S. Cl. 307—255                                    1 Claim

ABSTRACT OF THE DISCLOSURE

A polar telegraphy receive current loop utilizing a solid-state switching bridge to reverse current flow through the teleprinter device in response to a received code which utilizes but a single power source. The received code is converted to a control signal which is applied to a solid-state switching bridge to reverse the conducting states of transistors in diagonal pairs of the bridge. This reversal causes the direction of current flow through the teleprinter connected across one pair of diagonal arms of the bridge to change. The solid-state bridge is so arranged that the transistor switches in opposite arms are interconnected so as always to be in the same stable state, whereas the transistor switches in the opposite pair of diagonal bridge arms are always in the other stable state. By means of this bi-stable interconnection, the current flow through the teleprinter may be switched quickly and effectively utilizing but a single power source for the polar receive loop.

---

This invention relates to a polar telegraph receive loop current control arrangement and, more particularly, to one utilizing a solid-state bridge switching circuit.

In telegraphy, and particularly in teleprinter or Teletype applications, the loop current supplies must be capable of reversing the D.C. current through the teleprinter or Teletype device in response to the received signal code. In presently available arrangements, the D.C. loop current for the teleprinter is reversed by providing a pair of oppositely poled D.C. sources and a highly sensitive polar-type electromechanical switching relay. The relay is selectively activated to connect one or the other of the power sources to the teleprinter, so that current flow is reversed as the sources are switched. Such loop supplies have many shortcomings which limit their utility and usefulness. First and foremost, two loop power sources are required, which, of course, adds the cost of the additional source to the equipment cost. Furthermore, the use of two loop power sources introduces operational difficulties in that any difference in the voltage levels of the two power sources causes a corresponding difference in the loop current magnitudes. That is, unless the power supplies are closely matched or closely regulated, the magnitude of the current in one direction of flow is different from the magnitude of the current in the other direction of flow, thereby introducing difficulties in the operation of the teleprinter or Teletype device operated from the loop source.

Also quite often more than one current loop must be operated from the two power sources, and this introduces further difficulties, since the operation of a relay in any one loop (to disconnect the associated teleprinter from one source and connect it to the other) varies the loading on the two sources. Thus, a change in current in the remaining loops is produced by any change occurring in any one of the loops. Thus, by using two separate power sources to switch direction of current flow, there is substantial interaction between different loops operating from the same power sources; a result which is highly undesirable in terms of the operation of the teleprinter or Teletype devices.

Besides the difficulties flowing from the use of two separate loop power sources, the use of electromechanical switching devices introduces an entirely different set of problems. Electromechanical relays are, of course, slow in operation, and require periodic adjustment. Furthermore, because they include relay windings which are inductive in nature, protection must be provided against the high transient voltages, or inductive "kick" which may be induced in the windings during switching.

It is, therefore, a primary objective of this invention to provide a polar telegraph receive loop current control arrangement capable of selectively reversing the D.C. loop current to a teleprinter or the like while utilizing but single loop power source.

A further objective of this invention is to provide a polar telegraph receive loop current control arrangement which utilizes a solid-state switch to provide the reversing D.C. loop current for teleprinter or Teletype devices.

Still another objective of this invention is to provide a polar telegraph receive loop current control arrangement which is simple in construction, effective in operation, and inexpensive to manufacture.

Other objectives and advantages of this invention will become apparent as the description thereof proceeds.

The various objectives and advantages of the instant circuit arrangement are achieved by providing a solid-state bridge switching circuit for the polar receive loop current arrangement. The bridge includes solid-state transistor switches in each of the bridge arms. The transistor switches in opposite arms are so interconnected as always to be in the same stable state. This interconnection is further arranged to insure that when the switching elements in one pair of diagonal bridge arms are in one stable state, the corresponding switches in the other pair of diagonal bridge arms are in the other stable state. By selectively controlling the stable state of the solid-state switches in one pair of diagonal arms from an external control source, the stable condition of the switching pairs are selectively switched back and forth to reverse the current flowing through the bridge, thus providing the required polar or reversing current for a teleprinter or Teletype device.

The various features of the invention, which are believed to be new and novel, are set forth with particularity in the appended claims. The invention, itself, however, may best be understood by reference to the following description, when taken in conjunction with the accompanying drawings, in which:

FIGURE 1 is a schematic illustration in which, for simplicity, and to illustrate the mode of operation, the switching bridge is illustrated as having electro-mechanical switching elements.

FIGURE 2 is a schematic illustration of a polar telegraph current loop utilizing a solid-state bridge switching circuit.

FIGURE 1 illustrates a polar-telegraph receive loop current control arrangement, in highly simplified form, in order to illustrate the manner in which the loop current through the load, such as a teleprinter, may be reversed by use of but a single power source. In this schematic illustration, the switching bridge is shown to include a pair of interlocked electromechanical switches which are actuated to establish the proper direction of current flow through the teleprinter. It will be appreciated, however, that in actuality the switching arrangement uses solid-state switching elements, rather than electromechanical ones. The loop power source, not shown, is connected to supply terminals 10 and 11, and provides current for a teleprinter device 12. In operating devices of this type, the current flowing through the teleprinter must periodically be reversed in response to the received input code in order to operate the device properly. The reversible current flow through teleprinter 12 is shown by means of the solid and dotted arrows of FIGURE 1. The input code signals which may take any form including frequency shift keying, tone signals, D.C. pulses, etc., are converted in a receiver to a suitable form to energize the bridge. In FIGURE 1, the control signal is applied to input terminal 13 of switch control 14, which actuates a pair of solid-state switches 15 and 16. These are shown, for the sake of convenience, to have armatures 17 and 18 moving between associated contact pairs 19–20 and 21–22. In actuality, no moving elements are utilized in the bridge as will presently be explained in connection with FIGURE 2. The armatures are interlocked and, as shown, in one position armatures 17 and 18 are respectively moved to upper contacts 19 and 21. With the armatures in the position shown, current flow (using electron current convention) is, as shown by the solid arrows, from negative terminal 10 through contact 21, armature 18, through the teleprinter 12, and back through armature 17 and contact 19 to positive terminal 11. When polar or reverse current is to be drawn through teleprinter 12, the control signal applied to switch control 14 moves armatures 17 and 18 against lower contacts 20 and 22. The current flow is, as shown by the dashed arrows, from negative terminal 10 through contact 20, armature 17, through teleprinter 12, and back through armature 18 and contact 22 to positive terminal 11. Thus, the direction of current flow through the teleprinter may be reversed for polar operation with the use of but a single power source, as represented by the input 10 and 11. Any additional current loops which may be tied to the power source 10 and 11 will not be affected in their operation by the switching of the teleprinter current loop illustrated in FIGURE 1, since all of them are always connected to the same source, nor is there any difference possible in the magnitude of the loop current through the teleprinter for different directions of current flow by switching from one loop current source to another. It will be appreciated that by means of this arrangement, in general, all of the advantages of using but a single current loop in the operation of teleprinter or Teletype devices may be achieved.

FIGURE 2 illustrates an actual embodiment of a solid-state loop current switching arrangement which operates in the same mode as the circuit illustrated in FIGURE 1, and produces the desired operational characteristics through the use of but a single loop power source.

A D.C. control signal from a receiver for converting the received code is impressed on a pair of input terminals 25 and 26 with the polarity shown and varies discretely between zero and a fixed finite value. As the signal varies discretely between these levels, it controls a solid-state bridge which is switched to establish the proper direction of current flow through the teleprinter. The control signal selectively energizes a pulse generator 27, shown as an astable or free-running multivibrator, to produce an output pulse train whenever the D.C. signal is present. In the absence of a D.C. signal, the pulse geneartor is de-energized and produces no output pulses. The pulse train from pulse generator 27 is applied to a cascaded voltage-doubler shown generally at 28, to produce a positive unidirectional or D.C. voltage which is applied to a control or switching amplifier 29 which, in turn, controls a solid-state current switching bridge shown generally at 30.

Solid-state bridge 30 has four arms, each of which includes a switching transistor 31, 32, 33 and 35. A loop power source 36 is connected across one pair of bridge terminals 37 and 38, with teleprinter 39 being connected across the remaining pair of bridge terminals 40 and 41. The switching transistor elements are so interconnected that the transistors in a pair of diagonal bridge arms are always in the same stable state (i.e., on or off). Furthermore, the interconnection is such that the stable state of the transistors in one pair of bridge diagonal arms is opposite to the state of the transistors in the other pair of diagonal arms. Transistor 32 is, therefore, always in the same stable state as transistor 35. However, the transistor pairs (32–33 and 31–35) are always in opposite stable states. Thus, when transistors 32 and 33 are conducting, transistors 31 and 35 are cut off and, conversely, with transistors 31 and 35 conducting, transistors 32 and 33 are cut off. It is also apparent from observation that with transistors 31 and 35 in the conducting state, electron current flows from the negative terminal of the loop power source through the emitter-collector path of NPN transistor 31 to bridge terminal 41, over lead 42, through the teleprinter and then over lead 43 to bridge terminal 40 and the collector-emitter path of PNP transistor 35 back to the positive terminal of the loop supply. On the other hand, with transistors 32 and 33 conducting, electron current flows from the negative terminal of the loop power source through the collector-emitter path of NPN transistor 33 to bridge terminal 40 over lead 43 to teleprinter 39, and then over lead 42 to bridge terminal 41 and the emitter-collector path of PNP transistor 32 back to the positive terminal. By thus switching these transistor pairs, the direction of current flow through the teleprinter is selectively reversed.

Switching of the bridge is controlled by control switching amplifier 29, the output of which is coupled to the base electrode of transistor 35. The change in state of switching amplifier 29 selectively switches transistor 35 into the conducting or non-conducting state. Due to the interconnection of the transistors, presently to be described, switching of transistor 35 results in the switching of the transistor pairs in the diagonal bridge arms to reverse the current flow.

Pulse generator

Pulse generator 27 is an astable or free-running multivibrator consisting of a pair of NPN transistors 44 and 45, having their respective bases and collectors cross-coupled through capacitors 46 and 47. The bases of transistors 44 and 45 are connected to negative terminal 26 through base resistors 48 and 49, whereas their emitters are connected through resistors 50 and 51 to the negative terminal. The collectors of the individual transistors are connected through collector-resistors 52 and 53 to the positive terminal, and the bases are also connected to the positive terminal through the resistors 54 and 55. Supply voltage for the transistors and for the multivibrators is supplied by the D.C. control signal applied to the input terminals 25 and 26, so that with one state of the received code, there is no D.C. input across the terminal and the multivibrator is inoperative and produces no output. Whenever a D.C. control signal appears across the input terminals in response to a different state of the received code signal, a D.C. signal with the polarity shown is applied across these terminals, and provides supply voltage for transistors 44 and 45. The NPN transistors, which are interconnected as a conventional free-running multivibrator, are alternately driven into conduction at a rate determined by the time constant of the capacitors 46–47 and resistors 48–49.

Voltage doubler and switching amplifier

The pulse train generated by the free-running multivibrator in response to the appearance of the D.C. control signal is coupled through a capacitor 56 to a conventional cascaded voltage doubler, consisting of the diodes 57 and 58 and a storage capacitor 59. Diodes 57 and 58 are so poled that capacitor 59 charges to a positive voltage equal to twice the amplitude of the output pulses from pulse generator 27. This positive voltage is applied to the base of PNP transistor 60, which forms part of the control or switching amplifier 29. PNP transistor 60 has an emitter connected directly to the positive terminal of the loop supply source, and a collector connected through resistor 61 to the negative terminal of the loop supply source. Biasing for the transistor is supplied by a voltage divider consisting of resistors 62 and 63, connected between the positive and negative terminals of the supply source. The relative values of these resistors are such as to apply a negative voltage to the base with respect to the emitter. Thus, in the absence of a positive voltage from the voltage doubler, transistor 60 is in the conducting state. Whenever a D.C.-control signal appears at the input terminal 25 and 26, driving the free-running multivibrator into operation and producing a pulse train at its output, a positive voltage appears across voltage doubler capacitor 57 and is applied to the base of transistor 60. This positive voltage reverse-biases the base-emitter junction of transistor 60 and drives switching amplifier into the non-conducting state.

Since the collector of switching amplifier transistor 60 is connected directly to the base of bridge switching transistor 35, it controls the state of transistor 35 and, hence, that of its associated transistor in the diagonal arm of the bridge. In other words, by selectively switching the conductivity of transistor 35, the switching transistor pairs in the diagonal arms of the bridge are selectively driven into opposite stable states in order to control the direction of current flow through teleprinter 39. Thus, in the absence of a D.C. input to terminals 25 and 26, transistor 60 is in the conducting state and the voltage drop across the collector-emitter path is quite low and the voltage at its collector is, therefore, sufficiently positive to reverse-bias the base-emitter junction of PNP bridge transistor switch 35, thereby maintaining transistor 35 in the non-conducting state. This also maintains transistor 31, which is in the diagonal arm of the bridge in the non-conducting state, whereas transistors 32 and 33, which are in the opposite diagonal arms of the bridge are in the conducting state. Electron current, therefore, flows from the negative terminal of the loop source through the emitter-collector path of NPN transistor 33, over lead 43 to teleprinter 39, and thence over lead 42 and the emitter-collector path of PNP transistor 32 to the positive terminal of the power source. Under these conditions, electron current flow through the teleprinter is from left to right.

Whenever the D.C. control signal is impressed across input terminals 25–26, a positive voltage from voltage doubler 28 is applied to the base of PNP transistor 60. This positive voltage reverse-biases the base-emitter junction of the transistor and drives it into the non-conducting state. With transistor 60 driven into the non-conducting state, the voltage a its collector becomes more negative and begins to supply base current to the PNP transistor 35. This drives transistor 35 into conduction, along with its complementary transistor 31 in the diagonal bridge arm, while simultaneously driving transistors 32 and 33 in the opposite pair of diagonal bridge arms into the non-conducting state. With transistors 31 and 35 conducting, electron current flows from the negative terminal of the loop power source 36 through the emitter-collector path of NPN transistor 31, over lead 42 to teleprinter 39 and back over lead 43 and the collector-emitter path of PNP transistor 35 to the positive terminal of the loop power source. The electron current flow through the teleprinter 39 is thus reversed upon appearance of the D.C. control voltage at input 25 and 26.

Current switching bridge

Current switching bridge 30 includes four transistor switches, 31, 32, 33 and 35, connected in the arms of the bridge. Transistors 31 and 33, which are in two adjacent arms of the bridge, are of one conductivity type, i.e., NPN, whereas transistors 32 and 35, which are in the other two adjacent arms, are of the opposite conductivity type, i.e., PNP's. Transistors of the same conductivity type in adjacent arms are interconnected as a bi-stable switch, so that as one of the transistors is driven into the conductive state, it drives its associated transistors into the non-conducting state. It is clear, therefore, that the transistors in one pair of diagonal arms of the bridge are always in the same stable state, which stable state is always opposite to that of the transistor switches in the opposite diagonal arms of the bridge. Thus, the collector of NPN transistor 33 is connected through resistor 64 to the base of transistor 31, with the base being connected through resistor 65 to the negative terminal of the loop power source. Similarly, the collector of transistor 31 is connected through resistor 66 to the base of transistor 33, and the base to the negative terminal through a resistor 67. It can be seen that as transistor 33, for example, is driven into the conducting state so that its collector voltage goes negative, a negative voltage is applied to the base of NPN transistor 31 tending to drive that transistor into cut-off. Similarly, if transistor 31 is driven into the conducting state, the voltage at its collector goes negative, and this negative-going voltage is applied to the base of transistor 33, tending to drive that transistor into the non-conducting state.

Similarly, the collector of transistor 35 is connected through the parallel combination of resistor 68 and capacitor 69 to the base of PNP transistor 32. (Capacitor 69 is provided to speed the switching action whenever transistor 35 switches states.) Thus, whenever transistor 35 is driven into the conducting state by control switching amplifier 29, the voltage at its collector goes more positive, applying the positive-going voltage to the base of PNP transistor 32, driving that transistor into the non-conducting state.

It will also be apparent that by using transistors pairs of opposite conductivity, the switch of transistor 35 by amplifier 29 also will automatically affect the action of complementary transistors 31 in the opposite diagonal arm. Thus, whenever transistor 35 is driven into the non-conducting state, its collector voltage, as has been pointed out previously, tends to rise, thus applying a positive-going voltage to the base of PNP transistor 32, to switch that transistor into the non-conducting state; simultaneously the positive-going voltage is applied to the base of NPN transistor 31 through the resistor 64. This positive-going voltage, which has driven transistor 32 into the non-conducting state, drives transistor 31 into the conducting state. (Transistor 33 is, of course, driven into the non-conducting state by its interconnection with transistor 31 as a bi-stable device.) It can be seen that the transistors are always switched in pairs, since the transistors in opposite diagonal arms of the bridge are interconnected to switch them to the same state by using transistors of opposite conductivity in these arms. At the same time, transistors in adjacent arms are so connected as to make certain that they are always in opposite stable states. Thus, the bridge operates effectively and efficiently in response to the input signal to change the conductive path between the loop power source and the teleprinter in order to reverse direction of current flow through the teleprinter 39.

While a particular embodiment of the invention has been described and shown, it will be understood that it is not limited thereto, since many modifications and variations in the circuit arrangement for carrying out the invention may be made. It is contemplated that the appended claims cover any such modifications as fall within the true spirit and scope of this invention.

What is claimed as new and desired to be secured by Letters Patent of the United States is:

1. In a polar receive loop current control arrangement for reversing the direction of current flow through a teleprinter, the combination comprising,
    (a) a solid-state current switching bridge, each of the bridge arms including a transistor, means interconnecting the transistors in diagonal arms so that they always assume the same conductive state, and further means interconnecting said transistors so that the transistors in the bridge diagonal arm pairs are always in the opposite conductive state,
    (b) a unidirectional loop power source coupled across one pair of bridge terminals, (c) means adapted to connect a teleprinter load across the other pair of bridge terminals whereby a change in the conductive states of the transistors in the respective bridge diagonal arm pairs reverses the direction of current flowing out of the said other bridge terminals and through the load, (d) means for converting a received input code to produce a control signal for switching the said current switching bridge, said control signal having a characteristic which varies in accordance with the received input code, said means for converting a received input code to a control signal including a pulse generator which produces a train of output pulses whenever a received input code is present and produces no output in the absence of the received input code, (e) a rectifying network coupled to the output of said pulse generator to derive a unidirectional voltage from said pulses, (f) a control amplifer coupled between said rectifying network and a transistor in one of the bridge arms, said amplifier being responsive to the presence or absence of said unidirectional voltage to determine the conductive state of the transistor in said one bridge arm, thereby controlling the states of the transistors in the diagonal bridge arm pairs and the direction of current flow.

References Cited

UNITED STATES PATENTS

| | | | |
|---|---|---|---|
| 3,290,573 | 12/1966 | Kamens | 307—292 XR |
| 2,838,675 | 6/1958 | Wanlass | 307—88.5 |
| 3,078,379 | 2/1963 | Plogstedt et al. | 307—88.5 |

FOREIGN PATENTS 1,098,034  1/1961  Germany.

OTHER REFERENCES

"Transistor Chopper Drives Accurate Clock" by Williams in Electronics, engineering edition, dated May 23, 1958, pages 64 and 65.

JOHN S. HEYMAN, Primary Examiner

STANLEY D. MILLER, Assistant Examiner

U.S. Cl. X.R.

178—16; 307—127, 270, 288, 313